(No Model.) 3 Sheets—Sheet 2.
H. HOLLANDT.
PAN COVER.

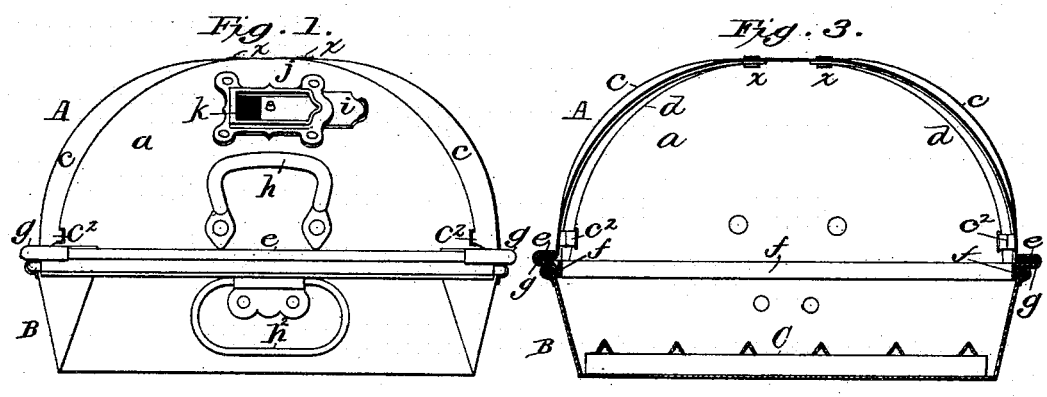
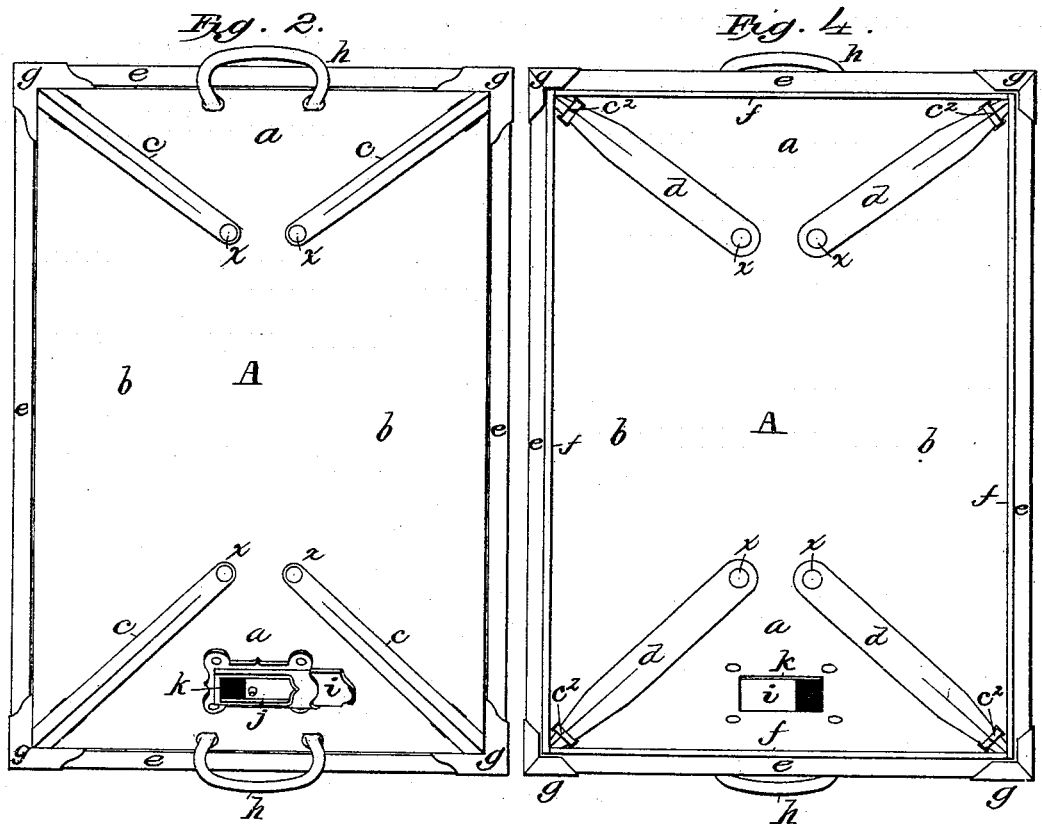

No. 487,443. Patented Dec. 6, 1892.

WITNESSES
A. J. Schwartz
Geo. W. Whitney

INVENTOR,
Herman Hollandt
By F. L. Erwin, Attorney.

(No Model.) 3 Sheets—Sheet 3.
H. HOLLANDT.
PAN COVER.
No. 487,443. Patented Dec. 6, 1892.
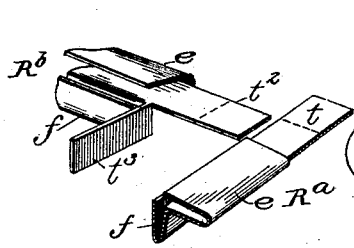
Fig. 11.
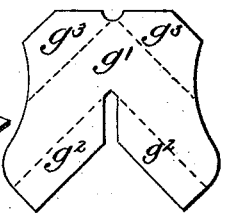
Fig. 12.
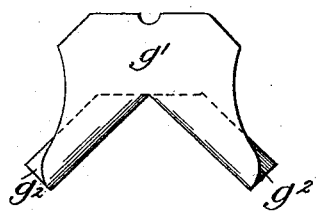
Fig. 13.
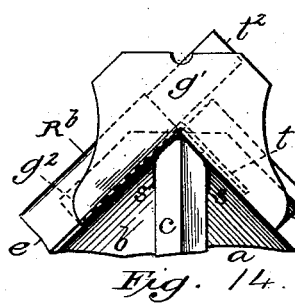
Fig. 14.
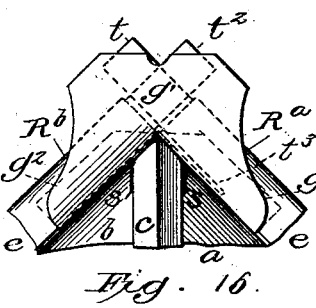
Fig. 16.
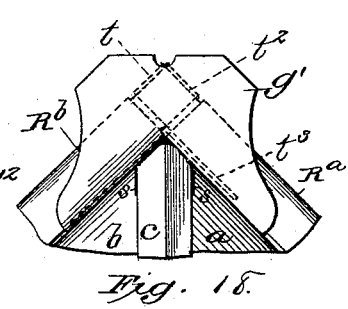
Fig. 18.
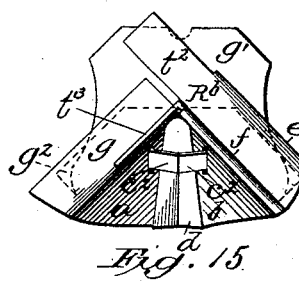
Fig. 15.
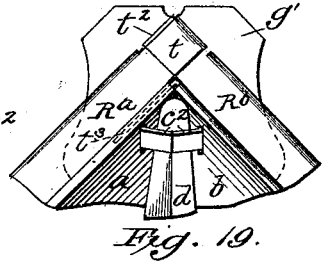
Fig. 17.
Fig. 19.
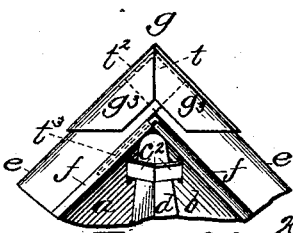
Fig. 20.
WITNESSES
A. J. Schwartz
Geo. W. Whitney
INVENTOR,
Herman Hollandt
By Chas. L. Ewin, Attorney.
THE NORRIS PETERS CO., PHOTO-LITHO., WASHINGTON, D. C.

UNITED STATES PATENT OFFICE.

HERMAN HOLLANDT, OF JERSEY CITY, NEW JERSEY, ASSIGNOR TO THE SILVER & COMPANY, OF NEW YORK, N. Y.

PAN-COVER.

SPECIFICATION forming part of Letters Patent No. 487,443, dated December 6, 1892.

Application filed July 13, 1892. Serial No. 439,888. (No model.)

*To all whom it may concern:*

Be it known that I, HERMAN HOLLANDT, a citizen of the United States, and a resident of Jersey City, in the State of New Jersey, have invented a new and useful Improvement in Pan-Covers, of which the following is a specification.

This invention relates to sheet-metal covers for use in connection with ordinary rectangular dripping-pans to form self-basting roasters or covered baking-pans.

The invention consists in a novel dome-shaped cover of sheet metal, having peculiarly-formed seams, rims, and corners, with or without a sliding "regulator" or "valve," the same being adapted to be manufactured without the aid of swaging-dies or seaming-rolls, as hereinafter set forth and claimed.

The objects of the invention are to render the pan-cover of attractive appearance, light, and sufficiently strong and to dispense with skilled labor and expensive machinery, as far as possible, in its production.

Three sheets of drawings accompany this specification as part thereof.

Figure 5:
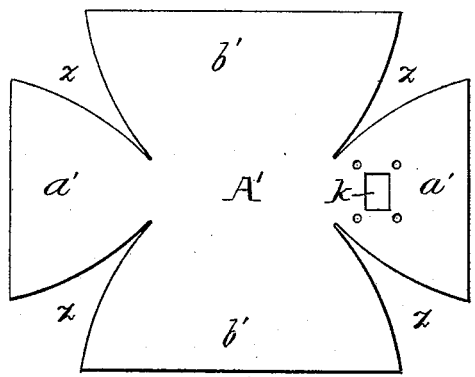
Figure 6:
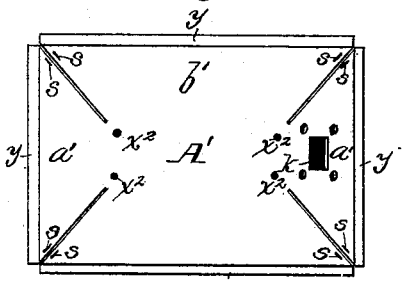
Figure 7:
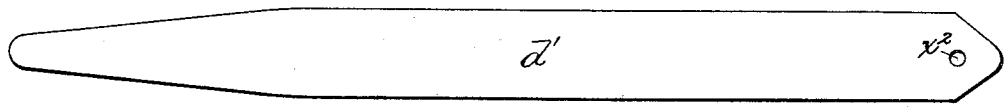
Figure 8:
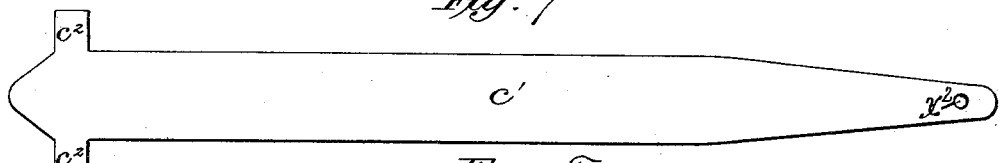
Figure 9:
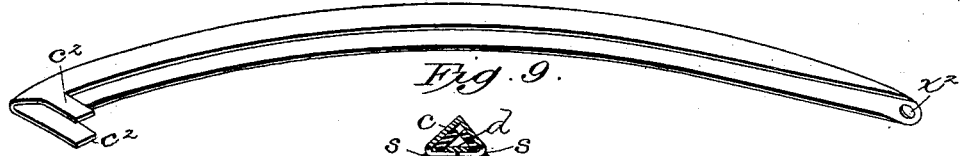
Figure 10:
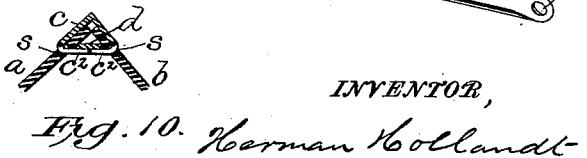

Figure 1 of the drawings is an end elevation of a covered pan, illustrating my said invention. Fig. 2 is a top view projected from Fig. 1. Fig. 3 represents a vertical cross-section through the cover and pan at mid-length. Fig. 4 is a bottom view of the cover. Figs. 5 and 6 are small-scale plans of the main blank or "flat iron" and the cover-body or main portion of the cover as bent up therefrom; and Figs. 7 to 20, inclusive, are detail views on a larger scale, illustrating the processes by which the cover is completed, Fig. 7 being a plan of an inside seam-strip blank, flat; Fig. 8, a like view of an outside seam-strip or "rib" blank, flat; Fig. 9, a perspective view of one of the latter shaped; Fig. 10, a horizontal section through a finished seam; Fig. 11, a perspective view of adjoining ends of two rim-pieces; Fig. 12, a plan view of a corner-piece blank, flat; Fig. 13, a top view of the same furnished with its preliminary bends; Figs. 14 and 15, top and bottom views of a corner with one rim-piece in position; Figs. 16 and 17, top and bottom views of the same with the adjoining rim-piece in position; Figs. 18 and 19, top and bottom views of the same, showing the corner-pieces fastened together; and Fig. 20 a bottom view of the completed corner.

Like reference-letters indicate corresponding parts in the several figures.

The improved pan-cover as an article of commerce and of use is represented at A on Sheet 1 of the drawings. It comprises an oblong dome-shaped body in one part, having convex-curved ends $a$ and sides $b$, the seams between which are closed and masked by external hollow ribs $c$ and internal seam-strips $d$, united at their upper ends by rivets $x$ and interlocked at their lower ends by clips $c^2$, projecting from said ribs $c$. Outwardly and downwardly projecting rims $e\ f$ and corner-pieces $g$ complete the cover at its bottom, rendering it free from cutting-edges and angles. It is preferably further provided with rigidly-attached handles $h$ and with a regulator or valve $i$, sliding in a frame $j$, which is riveted to one of said ends $a$ around a corresponding hole $k$ in the body-iron. These attachments $h\ i\ j$ are not, however, essential to the present invention and need not be of peculiar construction.

A suitable sheet-iron pan B, having folding handles $h^2$ beneath rigid handles $h$ on the pan-cover, is represented in Figs. 1 and 3, and a suitable internal "frame" or grid to complete a self-basting roaster is shown in cross-section at C in Fig. 3 by way of illustration; but said pan and grid form no part of this invention.

The process of making the body of said pan-cover A and closing and masking its seams, as aforesaid, is illustrated on Sheet 2 of the drawings, being as follows: A rectangular sheet of iron of proper weight and dimensions is provided by punching with curvilinear corner-notches $z$, Fig. 5, and with the said hole $k$ and rivet-holes at its corners if the cover is to be provided with said valve $i$ and frame $j$. The sheet is thus converted into the blank or flat iron A', (represented by Fig. 5,) with four leaves $a'\ b'$, adapted to form the ends and sides $a\ b$ of the cover, as before described, and also to form flat outwardly-projecting rim-sections $y$, Fig. 6, adjoining the respective sides and ends. The flat iron A' is next converted into the shape of the body of the cover A, as represented by Fig. 6, by bending down the several leaves $a'$ $b'$ over a suitable form and rebending their outer edges to form said rim-sections $y$. The flat blanks $c'$ $d'$, Figs. 7 and 8, of the ribs $c$ and seam-strips $d$ having been punched to provide them with rivet-holes $x^2$ and the former swaged into shape, as represented by Fig. 9, the cover-body, Fig. 6, is provided with corresponding rivet-holes $x^2$ to receive the rivets $x$ and with slots $s$ to receive the rib-clips $c^2$. One of the seam-strip blanks $d'$ is then placed inside and one of the rib-blanks $c'$ outside of each seam and their rivet $x$ and rib-clips $c^2$ are passed through the corresponding holes $x^2$ and slots $s$ and riveted and clinched, respectively. The fastening formed by the clinched rib-clips is shown in sectional detail by Fig. 10.

The modes and processes of forming the rims $e$ $f$ and corner-pieces $g$ and uniting them with each other and with the body of the pan-cover A are illustrated by Figs. 11 to 20, inclusive, on Sheet 3 of the drawings and are as follows:

The rims $e$ $f$ on the respective ends and sides of the cover A are parts in common of "rim-strips" $R^a$ $R^b$, which are formed in suitable lengths from thin sheet-iron by a bending operation. Each end of each rim-strip $R^a$ is provided in continuation of the bottom of the rim $e$ with a tongue $t$, and each end of each rim-strip $R^b$ is provided with a like tongue $t^2$ and with another one $t^3$ at right angles to the outer side of the downwardly-projecting rim $f$.

The corner-pieces $g$ are formed from flat blanks $g'$, one of which is represented by Fig. 12, the dotted lines in this figure representing the lines along which the blank is bent. Each blank is first bent so as to give its inner edges $g^2$ a permanent underlying position, as in Fig. 13. One of the rim-strips—$R^b$ for example—and a bent-up corner-piece blank $g'$ are then interlocked with each other and with one of the rim-sections $y$ by covering the latter with the rim or rim-cover $e$ and at the same time hooking the corresponding underlying edge $g^2$ of the corner-piece blank under the upper portion of said rim-cover $e$, as illustrated by Figs. 14 and 15. The adjoining rim-strip $R^a$ in the example is next applied endwise to the tongue $t^3$ and the corresponding edge portion $g^2$ and simultaneously to the corresponding rim-section $y$, the latter and said edge $g^2$ being embraced by the rim $e$, as before, while said tongue $t^3$ is embraced by the downwardly-projecting rim $f$ of the adjoining rim-section, as illustrated by Figs. 16 and 17. The tongue $t^2$ is then rebent over the tongue $t$ and the extremity of the latter over that of said tongue $t^2$, which securely locks the rim-strips together, as illustrated by Figs. 18 and 19, and the outer corners $g^3$ of the corner-piece blank are then closed in over the interlocked tongues to neatly mask them and to complete the corner, as shown in bottom view by Fig. 20. The other corners of the cover are completed in substantially the same way, and the cover is thus finished as regards the present invention.

Details of shape and proportions may be varied, and other like modifications will suggest themselves to those skilled in the art.

Having thus described the said pan-cover, I claim as my invention and desire to patent under this specification—

1. A dome-shaped pan-cover of bent-up sheet metal, having convex-curved ends and sides, with the seams between closed and masked externally by overlying metallic ribs, substantially as hereinbefore specified.

2. A dome-shaped pan-cover of bent-up sheet metal, having convex-curved ends and sides, with the seams between closed and masked by external ribs and internal seam-strips which are attached at their upper ends by rivets common to both and interlocked with each other and with the cover-body at their lower ends by clinched clips projecting from said ribs through slots in said cover-body on both sides of each seam, substantially as hereinbefore specified.

3. A dome-shaped pan-cover of bent-up sheet metal, having convex-curved ends and sides and outwardly-projecting rim-sections and provided with outwardly-projecting hollow rims which inclose said rim-sections and downwardly-projecting hollow rims integral with said outwardly-projecting rims, substantially as hereinbefore specified.

4. A dome-shaped pan-cover of bent-up sheet metal, having convex-curved ends and sides and outwardly-projecting rim-sections forming parts of the cover-body, rim-strips embracing said rim-sections and interlocked with each other at the corners of the cover, and corner-pieces interlocked with said rim-strips at top and clinched at bottom, substantially as hereinbefore specified.

HERMAN HOLLANDT.

Witnesses:
 GUY. W. FERDON,
 JOHN J. O'BRIAN.